Figure 1:
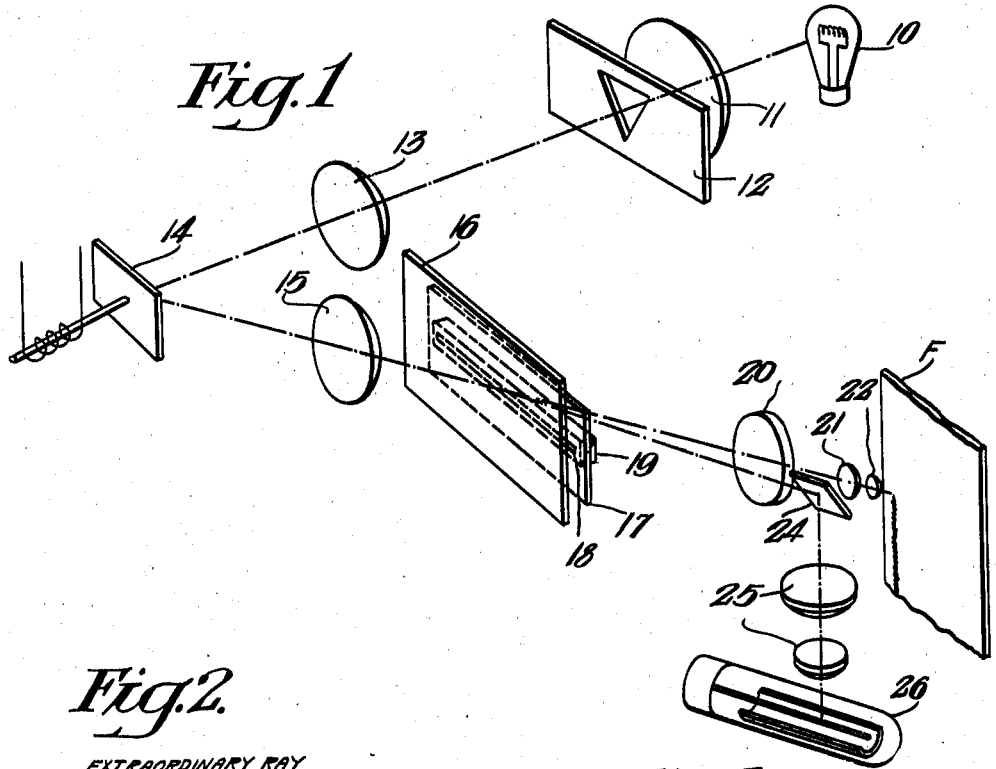

July 14, 1942.  L. T. SACHTLEBEN  2,289,885

PHOTOGRAPHIC SOUND RECORDER

Filed April 4, 1940

Inventor
Lawrence T. Sachtleben
By
Attorney

Patented July 14, 1942

2,289,885

UNITED STATES PATENT OFFICE 2,289,885

PHOTOGRAPHIC SOUND RECORDER

Lawrence T. Sachtleben, Camden, N. J., assignor to Radio Corporation of America, a corporation of Delaware Application April 4, 1940, Serial No. 327,759

14 Claims. (Cl. 179—100.3)

This invention relates to photographic sound recording and more particularly to the monitoring of the recorded signals during the recording operation.

The photographic recording of sound on film is well known and widely used commercially. Although the present invention is described in conjunction with one specific form of recording apparatus, it is apparent that its use is not limited to that specific type of apparatus but it may be used with any usual form of photographic sound recorder. In photographic recording of sound it is sometimes desirable for one reason or another to use light of some specific characteristic. For example, it may be desired to use polarized light in order to decrease the reflection of light by the crystals of sensitive material within the photographic emulsion which produces a consequent diffusion of the image. The recording of sound by polarized light is per se well known, since the light is necessarily polarized in such an apparatus as a Kerr cell recorder. The use of a polarizer also decreases the intensity of the recording beam some 50 percent and although the monitoring of such a polarized beam is quite practical, as described and claimed, for example, in Zworykin Patent No. 1,834,197, nevertheless such monitoring causes a further loss of light which is disadvantageous.

In the apparatus of the present invention I provide means for recording with polarized light and for monitoring while recording without reducing the intensity of the recording beam by removing therefrom the light used for monitoring. This result is accomplished by using a light dividing means, such as a polarizing prism, which will transmit the desired portion of the light beam and which will refract or reflect the portion of the light beam which is not to be used for recording into the monitoring apparatus where it will serve for monitoring as effectively as would a portion of the recording beam. It will thus be seen that by using the portion of the light beam which would otherwise be discarded, I secure improved optical efficiency and am enabled to record with lower light intensities than would otherwise be necessary for securing a record of adequate density.

One object of the invention is to provide an improved photographic sound recording system.

Another object of the invention is to provide a system for recording sound on film by means of polarized light.

Another object of the invention is to provide an improved monitoring system for a photographic sound recorder.

Another object of the invention is to provide a monitoring system which will serve to monitor the recording apparatus by means of the portion of the light beam which would otherwise be discarded.

Another object of the invention is to provide an improved polarizing and monitoring system which may be attached bodily to a standard sound recording apparatus without any other material modification thereof.

Figure 2:
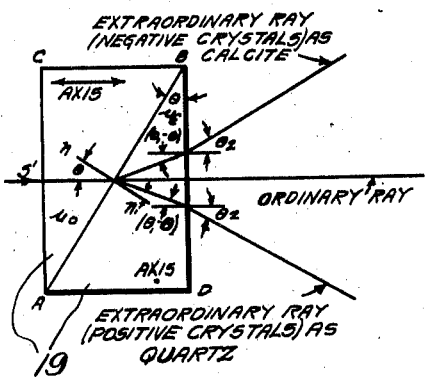
Figure 3:
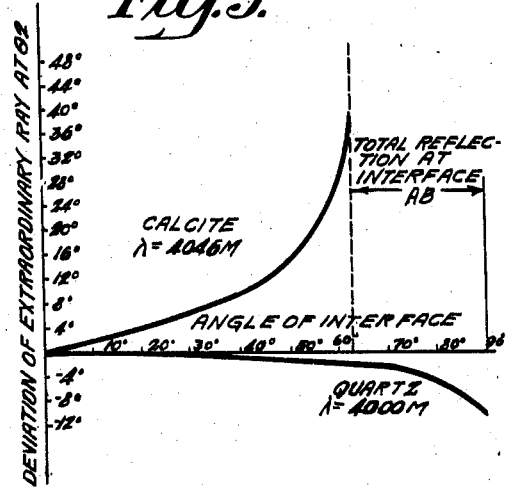

Other and incidental objects of the invention will be apparent to those skilled in the art from a reading of the following specification and an inspection of the accompanying drawing, in which Figure 1 is a perspective schematic view of one type of recording optical system including the apparatus according to the present invention, Figure 2 is an end view of a polarizing prism such as may be used in this apparatus and showing the path of the rays therethrough, and Figure 3 shows curves of the relation between the prism angles and the angle of the deviated rays in a prism such as shown in Fig. 2.

Referring to the recording apparatus shown in Fig. 1, light from a source 10 is directed by the condenser lens 11 through the aperture in the plate 12 to a second lens 13, which, with the lens 11, focuses an image of the light source 10 on the galvanometer mirror 14. The galvanometer mirror 14 is adapted to be vibrated about a horizontal axis and to move the light beam up and down on the slit plate 17 on which an image of the aperture in the plate 12 is formed by the lenses 13 and 15. A color screen 16 may be inserted, if desired, in front of the slit 18 in the plate 17. Light passing through the slit 18 is focused on the film F by the objective composed of the lenses 21 and 22.

Adjacent the slit 18 there is provided the polarizing prism 19 which will be hereinafter described in more detail. This prism polarizes the light in a predetermined plane without deflecting the main polarized beam and it therefore does not interfere with the alignment of the remaining elements of the optical system. Since the shape and location of the prism 19 is determined by the position of the slit 18 a plane parallel quartz plate 20 may be placed in the beam to rotate the plane of polarization of the beam, if so desired. This plane parallel quartz plate 20 is cut with its optic axis parallel to the optical axis of the system and normal to its faces. The amount of rotation of the plane polarization is determined by the thickness of the plate 20.

The polarizing prism, an end view of which is shown in Fig. 2, is preferably of what is known as the Rochon type. This prism differs from the more usual Nicol prism in that the optical surfaces thereof are perpendicular to the axis of the ordinary ray, and also in that the prism is of relatively small dimensions along the optical axis. This type of prism, therefore, produces the minimum defocusing of the optical system and renders its addition in a conventional optical system much simpler than would be the case with other types of polarizing prisms. Another advantage of this type of prism is that it can be made relatively long and narrow transversely of the beam, which is extremely difficult in the case of a Nicol prism.

As shown in Fig. 2, the ordinary ray passes through the prism without deflection along the optical axis of the system. The direction of deflection of the extraordinary ray depends upon the material of which the prism is made, the direction of deflection being indicated in Fig. 2 and the quantity thereof as determined by the angle of the interface of the prism being shown in Fig. 3. It will be apparent from Fig. 2 that the extraordinary ray is deflected in one direction for a negative crystal, such as calcite, and in the opposite direction for a positive crystal, such as quartz, and the prism would be turned in the appropriate direction according to the material from which it is made.

Referring again to Fig. 1, the extraordinary ray deflected by the prism 19 is directed to the reflector 24 which is spaced from the axis of the ordinary ray used for recording a sufficient distance so as to not interfere with the light transmission through the lenses 21 and 22. This reflector 24 directs the light from the extraordinary ray downward through the lenses 25 to the monitoring device 26, which is here indicated as a photocell. It will be apparent that any other type of monitoring device may be substituted for the photocell. For example, the light may be focused on a monitoring card or a ground glass screen, or the beam may be viewed through an eye piece, if desired.

It will be apparent to those skilled in the art that my invention is not limited to the use of polarized light nor to the use of the specific type of polarizing means described, but that I may substitute other types of light selecting and deflecting means which will transmit the component of the light beam which it is desired to use for recording substantially unchanged while directing the portion of the beam which is not to be used or which is useless for recording to the monitoring apparatus. As an example of such an alternative form of apparatus, the prism 19 may have an interface angle of 45° and have a dichroic reflector such as gold, silver or eosin between the faces. With such an arrangement, the reflecting interface would, of course, substitute for the reflector 24 and itself direct the light beam through the lenses 25. The dichroic reflectors mentioned are themselves well known and have the following characteristics: eosin transmits red and reflects green; gold transmits green and the adjacent portion of the visible spectrum toward the blue and reflects from the orange into the infra red; and silver transmits from the blue-violet to the ultra-violet, reflecting the remainder of the visible spectrum.

I claim as my invention:

1. Sound recording apparatus for recording the sound by means of a component of a beam of light including means for transmitting said component and for simultaneously deflecting the complementary polarized component of said beam, and monitoring means located in the path of said complementary polarized component.

2. Sound recording apparatus for recording the sound by means of a colored component of a beam of light including means for transmitting said component and for simultaneously relatively deflecting the complementary component of said beam, and monitoring means located in the path of said complementarily colored component.

3. Sound recording apparatus for recording the sound by means of a desired component of a beam of light including polarizing means for transmitting said component and for simultaneously relatively deflecting an undesired component of said beam, and monitoring means located in the path of said undesired component.

4. Sound recording apparatus for recording the sound by means of a component of a beam of light including means for transmitting said component without deflection and for simultaneously deflecting the complementary polarized component of said beam, and monitoring means located in the path of said complementary polarized component.

5. Sound recording apparatus for recording the sound by means of a desired component of a beam of light including polarizing means for transmitting said component without deflection and for simultaneously deflecting an undesired component of said beam, and monitoring means located in the path of said undesired component.

6. Sound recording apparatus including a light source, a light modulator, means for directing modulated light on to a film, and means between said modulator and said film for transmitting one component of the light to the film and relatively deflecting the complementary polarized component.

7. Sound recording apparatus including a light source, a light modulator, means for directing modulated light on to a film, means between said modulator and said film for transmitting a component of the light to the film and relatively deflecting the complementary polarized component, and monitoring means in the path of complementary polarized component.

8. Sound recording apparatus including a light source, a light modulator, means for directing modulated light on to a film, and dichroic reflecting means between said modulator and said film for transmitting a desired component of the light and deflecting an undesired component.

9. Sound recording apparatus including a light source, a light modulator, means for directing modulated light on to a film, dichroic reflecting means between said modulator and said film for transmitting a desired component of the light and deflecting an undesired component, and monitoring means in the path of said undesired component.

10. Sound recording apparatus including means for producing a beam of modulated light, means for dividing said beam of light into two portions of qualitatively complementary physical characteristics of which one portion is particularly adapted to recording sound on film, means for directing said portion on to a film, and monitoring means in the path of said other portion.

11. In combination with a sound recording system including a narrow aperture adapted to pass a beam of light and means for focusing an image of the light passing through said aperture on to a photographic recording medium, a polarizing prism placed adjacent said aperture and passing the beam of polarized recording light, light deflecting means located in the beam of polarized light not transmitted to said recording medium, and a monitoring means located in the deflected beam of light.

12. In combination with a sound recording system including a narrow aperture adapted to pass a beam of light and means for focusing an image of the light passing through said aperture onto a photographic recording medium, a polarizing prism placed adjacent said aperture and passing the beam of polarized recording light without material deflection, light deflecting means located in the beam of polarized light not transmitted to said recording medium, and a monitoring means located in the deflected beam of light.

13. Sound recording apparatus for recording the sound by means of a desired component of a beam of light including polarizing means for transmitting said component and for simultaneously deflecting an undesired component of said beam, monitoring means located in the path of said undesired component, and means for rotating the plane of polarization located between the polarizing means and the record.

14. Sound recording apparatus for recording the sound by means of a desired component of a beam of light including polarizing means for transmitting said component and for simultaneously deflecting an undesired component of said beam, monitoring means located in the path of said undesired component, and means for rotating the plane of polarization located between the polarizing means and the record medium.

LAWRENCE T. SACHTLEBEN.